(12) United States Patent
Fu et al.

(10) Patent No.: US 9,137,017 B2
(45) Date of Patent: *Sep. 15, 2015

(54) KEY RECOVERY MECHANISM

(75) Inventors: Christina Fu, Saratoga, CA (US); Ade Lee, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 580 days.

This patent is subject to a terminal disclaimer.

(21) Appl. No.: 12/791,829

(22) Filed: Jun. 1, 2010

(65) Prior Publication Data

US 2011/0293098 A1    Dec. 1, 2011

Related U.S. Application Data

(63) Continuation-in-part of application No. 12/790,119, filed on May 28, 2010.

(51) Int. Cl.
*H04L 29/06* (2006.01)
*H04L 9/08* (2006.01)
*H04L 9/32* (2006.01)

(52) U.S. Cl.
CPC ............. *H04L 9/0894* (2013.01); *H04L 9/321* (2013.01); *H04L 9/3263* (2013.01)

(58) Field of Classification Search
CPC ..... H04L 9/0894; H04L 9/3263; H04L 9/321; H04L 9/0897; H04L 9/0822; H04L 9/0643; H04L 9/0825

USPC ................ 726/4; 380/286; 709/206
See application file for complete search history.

(56) References Cited

U.S. PATENT DOCUMENTS

| | | | |
|---|---|---|---|
| 5,491,752 A * | 2/1996 | Kaufman et al. | 380/30 |
| 6,160,891 A * | 12/2000 | Al-Salqan | 380/286 |
| 2007/0280483 A1* | 12/2007 | Fu et al. | 380/286 |
| 2007/0288745 A1* | 12/2007 | Kwan et al. | 713/155 |
| 2008/0019526 A1 | 1/2008 | Fu et al. | |
| 2008/0022086 A1 | 1/2008 | Ho et al. | |
| 2008/0022088 A1 | 1/2008 | Fu et al. | |
| 2008/0022121 A1 | 1/2008 | Fu et al. | |
| 2009/0086977 A1* | 4/2009 | Berggren | 380/279 |
| 2010/0037050 A1* | 2/2010 | Karul | 713/167 |
| 2010/0111300 A1* | 5/2010 | Kido et al. | 380/46 |
| 2010/0199099 A1* | 8/2010 | Wu | 713/182 |

OTHER PUBLICATIONS

Administrator's Guide Red Hat Certificate System, Version 7.1, Sep. 2005, pp. 1-840.*
"PKCS 12 v1.0: Personal Information Exchange Syntax", *RSA Laboratories, a Division of RSA Data Security*, pp. 1-23, (Jun. 24, 1999).
"PKSC 12 v1.0: Personal Information Exchange Syntax," RSA Laboratories, Jun. 24, 1999, pp. 1-24.

* cited by examiner

*Primary Examiner* — Harunur Rashid
(74) *Attorney, Agent, or Firm* — Lowenstein Sandler LLP

(57) ABSTRACT

A method and system for key recovery for a private key of a digital certificate for a client.

18 Claims, 5 Drawing Sheets

CERTIFICATE PROFILE

Use this form to submit the request.

Certificate Profile – Key Recovery with Password for Private Key Delivery
This certificate profile is for recovering private keys Inputs

Password to Encrypt Private Key for Retrieval
- Password for Private Key Retrieval

SUBMIT

FIG. 5

KEY RECOVERY MECHANISM

RELATED APPLICATIONS

This application is a continuation-in-part of U.S. patent application Ser. No. 12/790,119, filed May 28, 2010.

TECHNICAL FIELD

Embodiments of the invention relate to the field of identity management systems, and more particularly, to key recovery mechanisms of identity management systems.

BACKGROUND

Identity management systems are information systems that support the management of identities. In particular, an identity management system establishes the identity of a subject or an object by linking a name (or number) with the subject or object. The identity management system may also describe the identity, for example, by assigning one or more attributes applicable to the particular subject or object to the identity. The identity management system may also modify the identity, such as by linking a new or additional name, or number, with the subject or object and/or change one or more attributes applicable to the particular subject or object. The identity management system can record and/or provide access to logs of activity by the identity.

One of the cornerstones of establishing a secure network environment is making sure that access is restricted to people who have the right to access the network. This access is allowed when the user can authenticate to the identity management system, meaning the user can verify his identity. The authentication may be managed by a public key infrastructure (PKI), such as implemented by a certificate system. For PKI, users and machines may present digital certificates to verify their identity. A digital signature is a mathematical representation of a message, using public key cryptography, which identifies the originator of the message, in a non-forgeable manner. Public key cryptography requires the use of two mathematically related keys—a public key and a private key (collectively referred to as a key pair). The private key is kept private by a single owner, and is not distributed to anyone else. The owner uses his or her private key, in conjunction with cryptographic algorithms, to digitally sign a message. The public key is made public, and can be used by anyone to verify the digital signature on a message. The fact that these two keys are mathematically related ensures that only a single private key can generate a digital signature that is verifiable by the corresponding public key, making the digital signature unforgeable. Public key encryption also allows protection of the confidentiality and integrity of a message or file. Using public key encryption the message or file is encrypted using the public key, which can only be decrypted using the private key. These asymmetric key algorithms allow one key to be made public while retaining the private key in only one location. A digital certificate, commonly referred to as a certificate, is an electronic document used to identify an individual, a server, a company, or another type of entity and to associate that identity with a public key. The digital certificate binds a person's identity to his or her public key, and consequently, to his or her private key, and may be used to verify digital signatures. Digital certificates and digital signatures then provide the foundation for secure transactions over a network, such as the Internet.

Certificate authorities (CAs) validate identities and issue certificates. CAs can be either independent third parties or organizations running their own certificate-issuing server software, such as a certificate system. Before issuing a certificate, a CA must confirm the user's identity with its standard verification procedures. The certificate issued by the CA binds a particular public key to the name of the entity identified by the certificate. In addition to the public key, the certificates include the name of the entity it identifies, an expiration date, and the name of the CA that issued the certificate.

These certificates can be stored on tokens, also referred to as smart cards, smart card tokens, security tokens, hardware tokens, hard token, USB tokens, cryptographic tokens, key fobs, or other hardware security modules (HSMs). The token may be a physical device that an authorized user of computer services is given to ease authentication. Tokens can store a certificate that is used for authenticating the identity of the owner. For example, when a user inserts a smart card into a system, the smart card presents the certificates to the system and identifies the user so the user can be authenticated over the network.

In a conventional system, a token client has a client application, such as an enterprise security client (ESC), which manages the token, and interacts with a token processing system (TPS) of a certificate system. The TPS, which acts as a registration authority (RA) of the CA, coordinates the enrollment process, and acts as a gateway between the token client and the certificate system. The TPS communicates with a token key service (TKS), which maintains master keys for tokens, and may store symmetric keys associated with the token. These keys may be derived from a single master key combined with smart card serial number or card universal identification (CUID) number. The TPS may also communicate with a data recovery manager (DRM), which maintains a database of encrypted private keys for recovery purposes. The DRM can archive the private key for later recovery. Archiving private keys offers protection for users, and for information, if that key is ever lost. When information is encrypted by the public key, the corresponding private key must be available to decrypt the information. If the private key is lost, the data cannot be retrieved. A private key can be lost because of a hardware failure or because the key's owner forgets the password or loses the hardware token in which the key is stored. The TPS also communicates with the CA to issue a certificate in response to the public key information and certificate enrollment request received from the token client. Examples of this conventional system are described in U.S. Patent Publication No. 2008/0022121, U.S. Patent Publication No. 2008/0022088, and U.S. Patent Publication No. 2008/0019526, all filed Jun. 6, 2006 and commonly assigned to the assignee of the present application.

When the private key of the token is lost or damaged, the token client can initiate a key recovery process. For example, the ESC can send a key recovery request to the TPS, which forwards the request to the CA to recover the private key. In the conventional system, the DRM encrypts the recovered private key with a password provided by an agent of the CA and delivers the encrypted private key to the token client. The agent then verbally communicates the password to the owner of the token in order to decrypt the encrypted private key. The conventional systems may be limited to token clients and require human interaction to verbally communicate the password to maintain security of the private key.

BRIEF DESCRIPTION OF THE DRAWINGS

The present invention will be understood more fully from the detailed description given below and from the accompanying drawings of various embodiments of the invention.

FIG. 5 illustrates an exemplary web page presented to a user by the certificate system containing a key recovery request form for private key recovery according to one embodiment.

DETAILED DESCRIPTION

Figure 1:
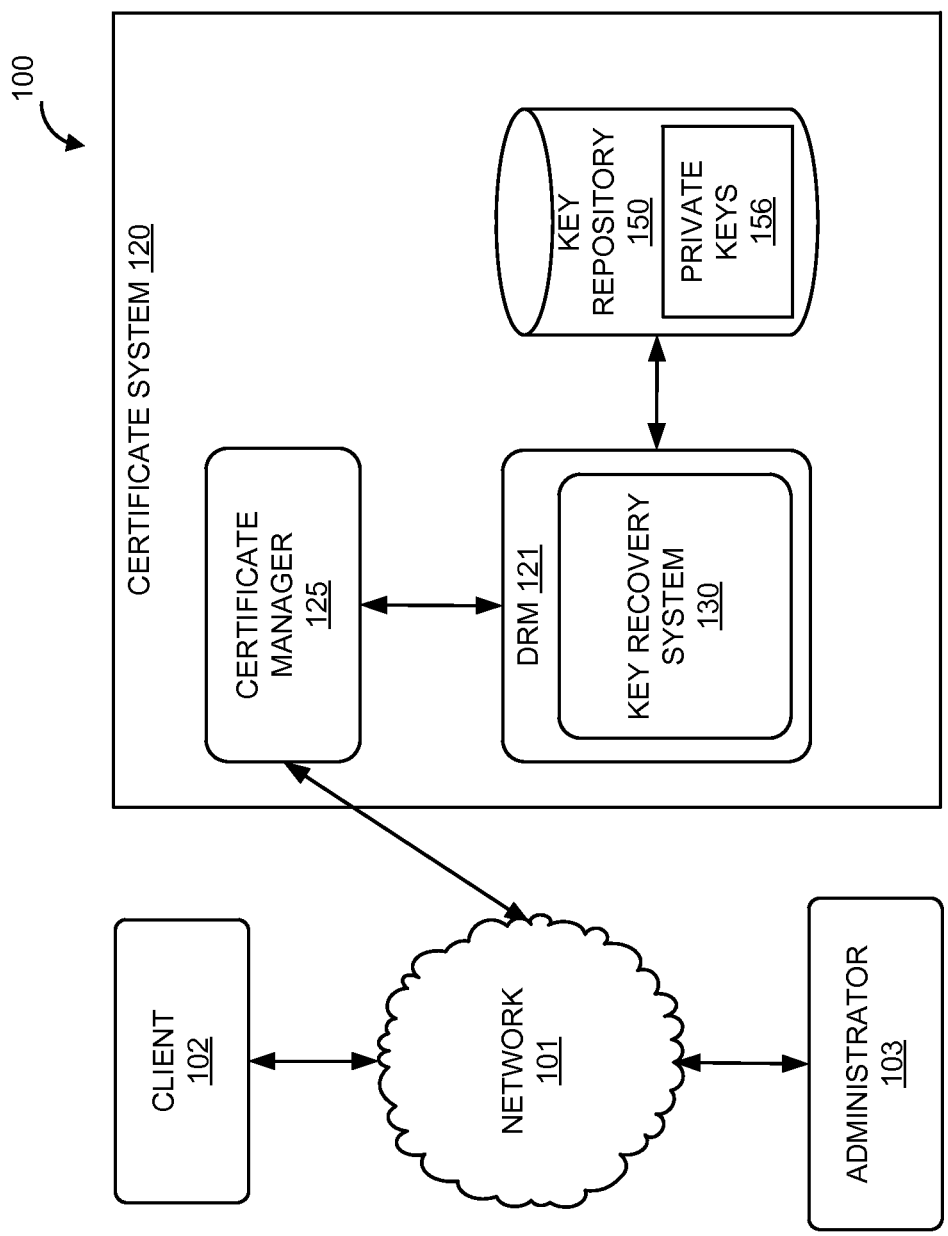
FIG. 1 is a block diagram of exemplary system architecture in which embodiments of a data recovery manager (DRM), having a key recovery system, may operate.

A method and system for key recovery for a private key of a digital certificate for a client. In one embodiment, a method includes receiving from a requester a key recovery request for a private key and a password from a requester. The method encrypts the recovered private key using the requester-provided password and delivers the private key to the requester. In one embodiment, the method receives an encrypted password from the requester and decrypts the encrypted password before encrypting the private key with the password. Since the password is encrypted using the transport key, the method can encrypt the private key for secure delivery to the requester. In this case of receiving a password from the requester that has been encrypted using the transport key, access to the private key can be limited to the user. In another embodiment, the method presents a user interface for key recovery, the user interface including an input field to receive the password from the requester. The method receives the key recovery request and password from the requester, approves the key recovery request, retrieves the private key from a key repository when the request is approved, encrypts the private key, and delivers the private key to the requester. The requester can decrypt the private key using the password, provided in connection with the key recovery request, and store the private key in the appropriate storage location.

Embodiments of the present invention provide an improved certificate system that allows private key recovery for both token clients and non-token clients. Instead of using an agent provided password to encrypt the recovered private key delivered to the client, the embodiments described herein receive a password from the requester and encrypt the recovered private key using the requester-provided password. By encrypting the private key using an encrypted password, provided by the requester, instead of the agent of the CA, the certificate system can encrypt the recovered private key with the requester-provided password for secure delivery to the requester, limiting access to the recovered private key, since presumably only the requester knows the password.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "encrypting," "decrypting," "delivering," "sending," "presenting," "signing," "publishing," "approving," "authenticating," "archiving," "processing," "providing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of a data recovery manager (DRM) 121, having a key recovery system, may operate. The architecture 100 includes a client 102, an administrator workstation 103 and a certificate system 120, each coupled to the network 101 that communicates any of the standard protocols for the exchange of information. The client 102 may be a token client or a non-token client. The token client is any type of device that uses a hardware token, smart card, or other physical hardware security modules (HSMs) to store the certificate including a public key and a private key. The non-token client may be any type of device that stores or uses the digital certificate (e.g., encryption certificate) without the digital certificate being stored on a token, smart card, or other physical HSMs. Certificates for non-token clients are sometimes referred to as soft tokens, since they do not use a hardware security device.

The network 101 may be a Local Area Network (LAN) and may be incorporated into the same physical or logical system, or different physical or logical systems. Alternatively, the certificate system 120 and client 102 may reside on different LANs that may be coupled together via the Internet but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120, administrator workstation 103, and the client 102.

The certificate system 120 may be hosted on one or more machines including one or more server computers, gateways or other computing systems. In one embodiment, the certificate system 120 resides on multiple servers, including a CA server that hosts the certificate manager 125, and the end users and/or agents on the client 102 can interact with the certificate system 120 via web browser applications on the client 102. It should be noted that various other network configurations can be used including, for example, hosted configurations, distributed configurations, centralized configurations, etc. The certificate system 120 includes various certificate system subsystems, including a certificate manager 125, a data recovery manger (DRM) 121 (also referred to as a key recovery authority), and a directory server 127, each of which is described in more detail below.

In one embodiment, the DRM 121 includes the key recovery system 130. In one embodiment, the key recovery system 130 of the DRM 121 is coupled with a key repository 150, which stores private keys 156 for later retrieval for recovery purposes. The key repository 150 can be accessed directly by the DRM 121 to recover the private key on behalf of the client 102, or may access the key repository via a directory server that manages the key repository. For example, when data has been encrypted using an encryption key, the client 102 uses the private key to decrypt the encrypted data; however, if the private key is lost, the data cannot be retrieved. A private key can be lost because of a hardware failure or because the key's owner forgets the password or loses the hardware token in which the key is stored, for examples. Similarly, encrypted data cannot be retrieved if the owner of the key is unavailable, for example, the owner of the key has left the organization that owns the data. The DRM 121 stores the private keys, or alternatively, the key pairs, so that a new, identical certificate can be generated based on recovered keys, and all the encrypted data can be accessed even after a private key is lost or damaged. In one embodiment, the key repository is implemented using a Lightweight Directory Access Protocol (LDAP) server. Alternatively, other types of database systems can be used to store the private keys.

In one embodiment, the key recovery system 130 encrypts the private key using a public storage key of a storage key pair (i.e., a public key used for encrypting the private keys 156 stored in the key repository 150 and a private key used for decrypting the private keys 156). The DRM 121 may be the only device that has the storage key pair in order to retrieve the corresponding private key 156 when a key recovery request is approved. The key recovery system 130 can access the private keys 156 in the key repository 150 and decrypt the private keys 156 using the private storage key of the DRM 121 to allow private key recovery. In one embodiment, the DRM 121 generates a session key to encrypt the user private key and then uses its public key to encrypt the session key and stores it with the encrypted user private key. During key recovery, DRM 121 uses its private key to decrypt the session key and then uses the session key to decrypt the user's private key. In another embodiment, the DRM can use the DRM public key to encrypt and private key to decrypt the user's private keys directly, without the extras session key. In one embodiment, the private keys 156 are stored with the corresponding public keys for retrieval purposes. Alternatively, other schemes may be used to know what private key to retrieve, such as identifier. The operations of the key recovery system 130 are described in more detail below with respect to FIGS. 2-5.

In other embodiments, the key recovery system 130 may be implemented in other components of the certificate system 120, such as, in the certificate manager 125, for example. In other embodiments, the certificate system 120 may include other certificate system subsystems as well, such as, for example, a token processing system (TPS), as described below with respect to FIG. 2.

The certificate manager 125 may operate as a CA that can issue, renew, revoke, and publish a wide variety of certificates, for servers, for users, for routers, for other subsystems, and for file or object signing. The certificate manager 125, also referred to as a CA server, can be implemented as software, hardware, firmware or any combination thereof. The certificate manager 125 is the core of a CA's Public Key Infrastructure (PKI). The PKI is a set of hardware, software, people, policies, and procedures needed to create, manage, distribute, use, renew, recover, and revoke digital certificates. The certificate manager 125 can also compile and publish certificate revocation lists (CRLs).

The client 102 and administrator workstation 103 may each be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. In one embodiment, an administrator on the administrator workstation 103 configures the key recovery system 130 to perform key recovery for the client 102. The client 102 and administrator workstation 103 may each provide web-browsing capabilities to render images, documents, etc., in a web browser using uniform resource locators (URLs) or links specified by the administrator (e.g., by activating a link). The web browser on the administrator workstation 103 allows an administrator to access an administrator console provided by the certificate system 120. The administrator console can allow the administrator to configure the key recovery system 130, and/or create or modify certificate profiles stored in a data storage device of the certificate system 120 pertaining to the key recovery requests. The administrator workstation 103 can use the management user interface (UI) for management of the certificates. In one embodiment, the administrator workstation 103 can access the management UI via a browser, in which case the UI is a web-based browser. In another embodiment, the administrator workstation 103 can access the management UI via a command line interface (CLI). The web browser on the client 102 allows a user to request key recovery, such as described with respect to FIG. 5. The web browser may be used to allow the user to retrieve the private key, recovered by the DRM 121, as well as the corresponding certificate.

Figure 2:
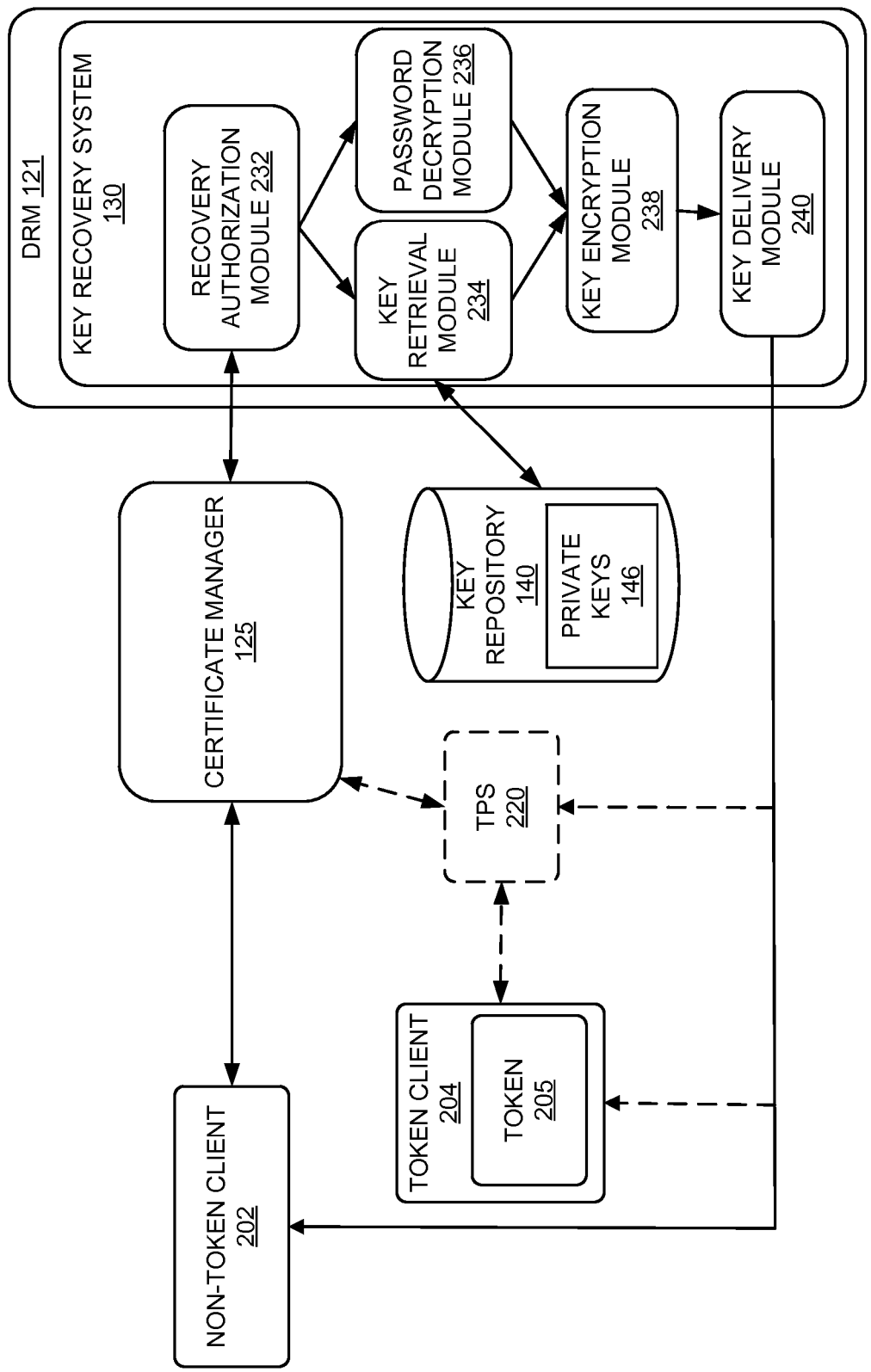
FIG. 2 is a block diagram of one embodiment of the key recovery system of the DRM of FIG. 1.

FIG. 2 is a block diagram of one embodiment of the key recovery system 130 of the DRM 121 of FIG. 1. In the depicted embodiment, the key recovery system 130 includes a recovery authorization module 232, a key retrieval module 234, a password decryption module 236, a key encryption module 238, and a key delivery module 240, which are each described in more detail below.

In one embodiment, the certificate manager 125 receives from the non-token client 202 a key recovery request for a private key of a digital certificate for the non-token client 202, and a password provided by the requester. The certificate manager 125 forwards the key recovery request and password to the DRM 121. The key recovery system 130 of the DRM 121 receives the key recovery request from the certificate manager 125. The recovery authorization module 232 determines whether to approve the key recovery request when the request complies with any key recovery constraints, for example, if key recovery is permitted for this type of key, if the non-token client 202 is authorized to retrieve the requested private key, or the like. When the recovery authorization module 232 approves the key recovery request, the key retrieval module 234 accesses the requested private key 146 stored in the key repository 140 when approved. If the retrieved private key is encrypted using a private storage key of the DRM 121, the key retrieval module 234 may decrypt the encrypted private key using the private storage key of the DRM 121. The key retrieval module 234 sends the retrieved private key to the key encryption module 238, which encrypts the private key using the password provided by the non-token client 202. In another embodiment, the key retrieval module 234 can retrieve and send the encrypted private key to the key encryption module 238, and the key encryption module 238 decrypts the encrypted private key using the private storage key before encrypting the private key using the provided password.

In one embodiment, the key encryption module 238 encrypts the private key into an encrypted file using a password. In another embodiment, the key encryption module 238 encrypts the private key and the corresponding certificate into an encrypted file for delivery to the non-token client 202. In one embodiment, the encrypted file is a Public Key Cryptography Standard (PKCS) #12 file. PKCS is a family of Public-Key Cryptography Standards, published by RSA Laboratories. PKCS standards define a file format commonly used to store X.509 private keys with accompanying public key certificates, protected with a password-based symmetric key. In another embodiment, the encrypted file is a PFX file, developed by Microsoft Corporation. Alternatively, the key encryption module 238 can encrypt the private key using other file formats, such as other Personal Information Exchange Syntax standards.

In one embodiment, the key recovery system 130 receives the password with the key recovery request. In another embodiment, the key recovery system 130 receives the password before or after receiving the key recovery request. For example, the non-token client 202 may initiate the key recovery by sending the key recovery request, and once the recovery authorization module 232 has approved the key recovery request, the key recovery system 130 can prompt the user of the non-token client 202 to input a password for delivery of the private key. In one embodiment, the non-token client 202 encrypts the password using a private key of a transport key pair of the DRM 121 and sends the encrypted password in connection with the key recovery request. In this embodiment, the key recovery system 130 decrypts the encrypted password using a private key of the transport key pair of the DRM 121. When the password is encrypted, the password decryption module 236 decrypts the encrypted password and sends the decrypted password to the key encryption module 238, which encrypts the private key using the decrypted password.

In another embodiment, the key recovery system 130 presents to the non-token client 202, via the certificate manager 125, a user interface for key recovery request on a web page. The web page may include an input field to receive a password from a user of the non-token client 202. The key recovery system 130 receives the key recovery request and the password. For example, when an end entity, i.e., the requester, selects the link corresponding to the key recovery request, the certificate manager 125, presents to the non-token client 202 a key recovery page containing a key recovery request form. FIG. 5 illustrates an exemplary web page presented to a user by the certificate system containing a key recovery request form for private key recovery according to one embodiment. The certificate manager 125 may present the web page 500 in response to the user selecting a link for private key recovery on another web page, such as clicking on the key recovery request tab, for example. The web page 500 includes a key request recovery form 502 that includes an input mechanism 504, such as input field box, that allows the user to input a password for private key recovery. The key encryption module 238 uses this password to encrypt the private key for delivery to the user, as described herein. After inputting the password, the user sends the enrollment request form 502 to the certificate manager 125, for example, by activating the submit button 506 on the enrollment request form.

In one embodiment, the non-token client 202 may encrypt at least the password using a public key of a transport key pair of the DRM 121 before sending the key recovery request and password to the DRM 121. In another embodiment, the password may be encrypted using other techniques as would be appreciated by one of ordinary skill in the art having the benefit of this disclosure. The password decryption module 236 decrypts the encrypted password using a private key of the transport key pair, and provides the password to the encryption module 238 for encrypting the retrieved private key. In another embodiment, the key recovery system 130 can be configured to detect if a password is received from the non-token client 202. In the case that no password is received from the non-token client 202, the key recovery system 130 can notify an agent of the CA to provide a password for private key delivery. In one embodiment, the key recovery system 130 provides a user interface to the agent to receive the password from the agent and provides the password to the key encryption module 238 to encrypt the private key. Since the password is not received from the requester, the agent needs to manually notify the requester of the password used to encrypt the private key. In one embodiment, the key recovery system 130 creates a service task to notify the requester of the password and notifies the agent of the service task to manually notify the requester. For example, the service task can be placed on an agent's queue of actions to be taken. To complete the service task, the agent may call the requester to verbally communicate the password. Alternatively, the agent may use other communication means to notify the requester of the password.

In the depicted embodiment, the key delivery module 240 receives the encrypted private key (and possibly the certificate) from the key encryption module 238 and delivers the encrypted private key to the requester (e.g., the non-token client 202). When the key encryption module 238 encrypts the private key in an encrypted file, the key delivery module 240 delivers the encrypted file to the requester. In one embodiment, the key delivery module 240 delivers the encrypted file to the requester by sending a message to the requester with a link to a location of the encrypted file to allow the requester to retrieve the encrypted file. The message may be an email message, an instant message, or the like. The key delivery module 240 can deliver the message to the non-token client 202 using the user interface provided by the certificate manager 125, or alternatively, by a messaging system that is external to certificate manager 125 and the DRM 121, such as via a email messaging system, an instant messaging system, or the like. For example, when presenting a first user interface with the key recovery request as a web page to the requester, the key delivery module 240, via the certificate manager 125, can present a second user interface, such as another web page, including a link to a location of the encrypted file to allow the requester to retrieve the encrypted file when the key recovery request is approved. In another embodiment, the key delivery module 240 delivers the encrypted private key (e.g., encrypted file) by sending an email message to the requester with the encrypted file as an attachment to the email message. Alternatively, the key delivery module 240 can deliver the encrypted private key to the requester via a web page presented to the user via the certificate manager 125.

As described herein, typically the DRM 121 of the certificate system 120 archives encryption certificates, but does not archive signing certificates for non-repudiation purposes. In some cases, an organization, using the certificate system 120, may have a policy that the encryption certificates be renewed periodically. In such cases, the DRM 121 archives at least the private key of the encryption key pair associated with encryption certificates, and the key recovery system 130 allows the non-token client 202 to retrieve the archived copy. It should also be noted that although signing certificates are typically not archived for non-repudiation purposes, the embodiments could also be used for key recovery of any type of key that is archived.

In the embodiments described above, the client 102 is the non-token client 202. In other embodiments, the client 102 may be a token client 204 having a token 205. In these embodiments, the token client 204 has a client application, such as an ESC, that communicates with the token of the token client 204 and the TPS 220 over the network 101. The TPS 220, which may act as a registration authority (RA) of the CA, coordinates the token operations between the token client 202 and the certificate system 120. In one embodiment, the TPS 220 communicates directly with the DRM 121 without the use of the certificate manager 125. The TPS 220 may also communicate with a token key service (TKS) (not illustrated), which maintains master keys for tokens, and may store symmetric keys associated with the token. These keys may be derived from a single master key combined with smart card serial number or card universal identification (CUID) number. The token client 204 may include a client application, such as the ESC, which is a user interface used by a user or the token 205 (e.g., a smart card) of the token client 204 to communicate with the certificate system 120. The ESC may be used in connection with the certificate system 120 to manage the token 205, such as, formatting the token 205, issuing certificates for the token 205, renewing certificates for the token 205, recovery the private key, and other management operations associated with the token 205, such as private key recovery. End users can use tokens to store user certificates, and can use the tokens for applications such as single sign-on access and client authentication. The certificate system 120 issues certificates and keys required for signing, encryption, and/or other cryptographic functions to be stored on end user's tokens. For example, the ESC may contact the TPS 220 when there is a token operation, such as the key recovery request, and the TPS 220 interacts with the certificate manager 125, DRM 121, or a TKS (not illustrated), as required, then sends the information back to the token 205 via the ESC.

In some embodiments, the ESC may present a user interface to allow the user to imitate key recovery, or alternatively, the user can access the TPS 220 directly to initiate the key recovery on behalf of the token client 204. The ESC can also be used to receive a password from the user to be used for delivery of the recovered private key. The DRM 121 receives the key recovery request from the TPS 220, as well as the password provided by the token client 204, and sends the key recovery request to be processed by the key recovery system 130 as described above. In one embodiment, when the key delivery module 240 delivers the encrypted private key to the token client 204, the key delivery module 240 may deliver the encrypted private key to the TPS 220 directly or via the certificate manager 125, as indicated by the dashed lines. Alternatively, the key delivery module 240 delivers the encrypted private key to the token client 204 directly without the TPS 220 or the certificate manager 125, as described above with respect to the non-token client 204 (e.g., an email messaging system, an instant messaging system, or the like).

Figure 3:
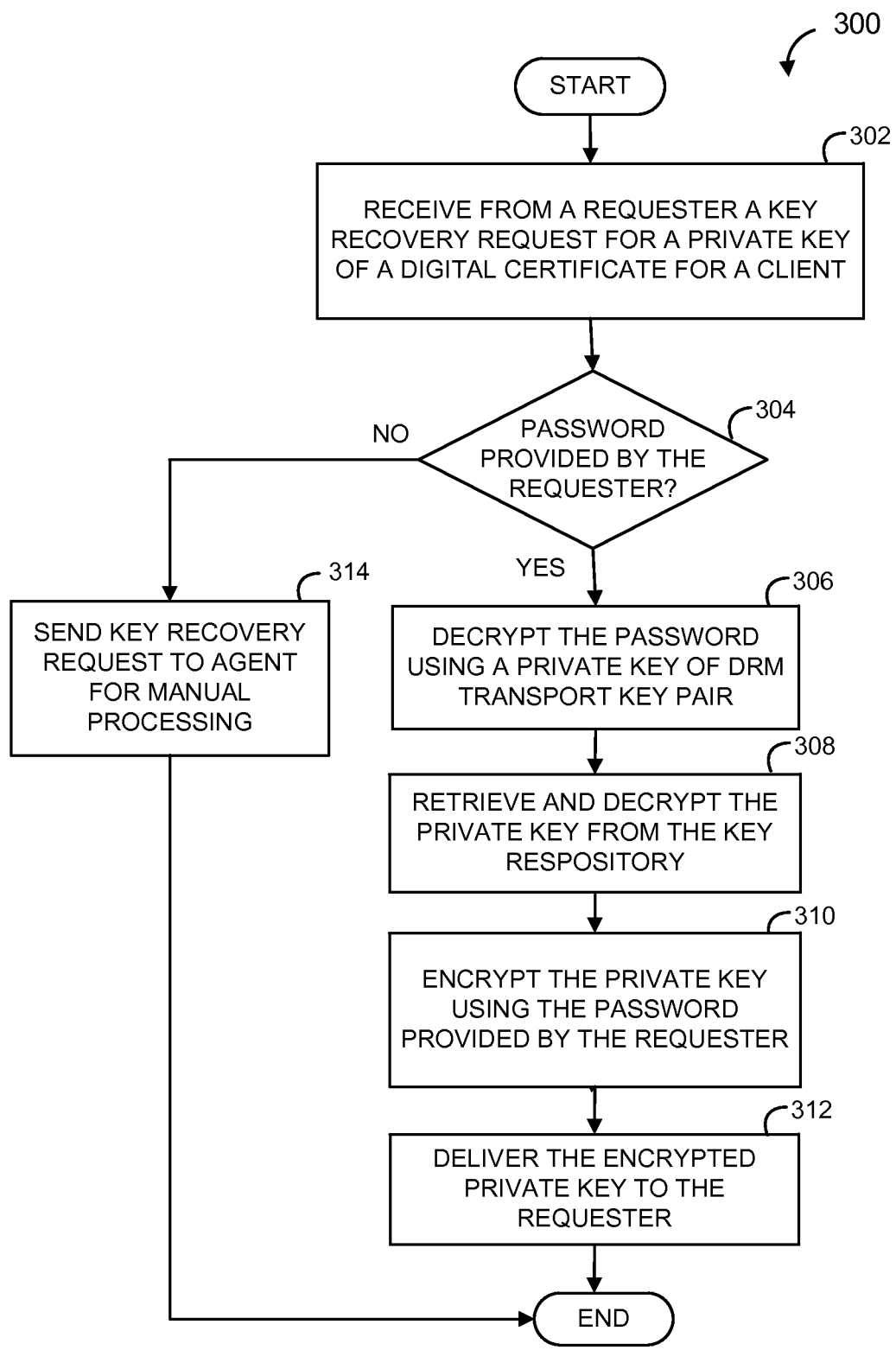
FIG. 3 is a flow diagram of one embodiment of a method of key recovery for a private key of a digital certificate for a client.

FIG. 3 is a flow diagram of one embodiment of a method 300 of key recovery for a private key of a digital certificate for a client. The method 300 is performed by processing logic that may comprise hardware (circuitry, dedicated logic, etc.), software (such as is run on a general purpose computer system or a dedicated machine), firmware (embedded software), or any combination thereof. In one embodiment, the key recovery system 130 of FIGS. 1 and 2 performs the method 300. In another embodiment, the DRM 121 of FIGS. 1 and 2 performs the method 300. Alternatively, other components of the certificate system 120 can perform some or all of the operations of method 300.

Referring to FIG. 3, processing logic begins with receiving from a requester a key recovery request for a digital certificate (block 302). Next, the processing logic determines if a password is received in connection with the key recovery request (block 304). If a password is received, the processing logic decrypts the password, if encrypted, for example, using a private key of a transport key pair (block 306), and retrieves and decrypts the private key stored in a key repository (block 308). The operations of blocks 306 and 308 can be performed sequentially in any order, or alternatively, concurrently with one another. In one embodiment, the processing logic encrypts the private key using a storage key, such as using a private storage key, and archives the encrypted private key in the key repository. When retrieving the encrypted private key from the key repository, the processing logic may decrypt the encrypted private key before encrypting the private key.

Next, the processing logic encrypts the private key using the password provided by the requester (block 310) and delivers the encrypted private key to the requester (block 312), and the method ends. In one embodiment, the processing logic encrypts the private key in a PKCS #12 file at block 310. In another embodiment, the processing logic packages the digital certificate and the private key as a PKCS #12 package, and encrypts the PKCS #12 package with the password provided by the requester. Alternatively, the processing logic can encrypt the private key at block 310 using other encryption techniques.

However, if at block 304, the processing logic determines that no password is received from the requester, the processing logic sends the key recovery request to an agent of the CA for manual processing (block 314), and the method ends. This may be similar to how conventional systems perform key recovery. For example, the processing logic may receive a password from an agent of the CA, and the agent manually provides the password to the requester. In one embodiment, the processing logic provides the password to the requester at block 314 by creating a service task to manually notify the requester of the password and notifying an agent of the certificate system of the service task to manually notify the requester of the password. The agent may notify the requester, for example, by verbally communicating the password directly to the requester. Alternatively, the agent may notify the requester using other communication means as would be appreciated by one of ordinary skill in the art having the benefit of this disclosure.

In one embodiment, the processing logic receives an encrypted password that has been encrypted using a public key of a transport key pair, such as the DRM's 121 transport key pair. In this embodiment, the processing logic on the client 102 encrypts the password using the public key, and the processing logic on the DRM 121 decrypts the encrypted password using a private key of the transport key pair. The processing logic then uses the decrypted password to encrypt the private key. In another embodiment, the processing logic presents to the requester a user interface for the key recovery request on a web page, including an input field to receive a password from the requester. The processing logic on the client 102 encrypts at least the password and sends the key recovery request to the processing logic of the DRM 121. The processing logic of the DRM 121 receives the key recovery request and the password, decrypts the password, approves the key recovery request, retrieves the private key from the key repository when the key recovery request is approved, encrypts at least the private key of the digital certificate in an encrypted file using the decrypted password.

In one embodiment, the processing logic delivers the encrypted file to the requester at block 312 by presenting a second user interface including a link to a location of the encrypted file to allow the requester to retrieve the encrypted file when the key recovery request is approved. In another embodiment, the processing logic delivers the encrypted file to the requester at block 312 by sending a message to the requester with a link to a location of the encrypted file to allow the requester to retrieve the encrypted file. In another embodiment, the processing logic delivers the encrypted file to the requester at block 312 by sending an email message to the requester with the encrypted file as an attachment to the email message. Alternatively, the processing logic can deliver the encrypted private key using other mechanisms as would be appreciated by one of ordinary skill in the art having the benefit of this disclosure.

In one embodiment, the client is a non-token client. In another embodiment, the client is a token client. In one embodiment, the processing logic at block 312 delivers the encrypted private key to the TPS, which communicates with a user interface of the token client to store the private key on the token of the token client. Alternatively, the processing logic delivers the encrypted private key to the token client using one of the delivery mechanisms described above with respect to the non-token client 202 (e.g., email messaging system, instant messaging system, a link on a web page, etc.).

Figure 4:
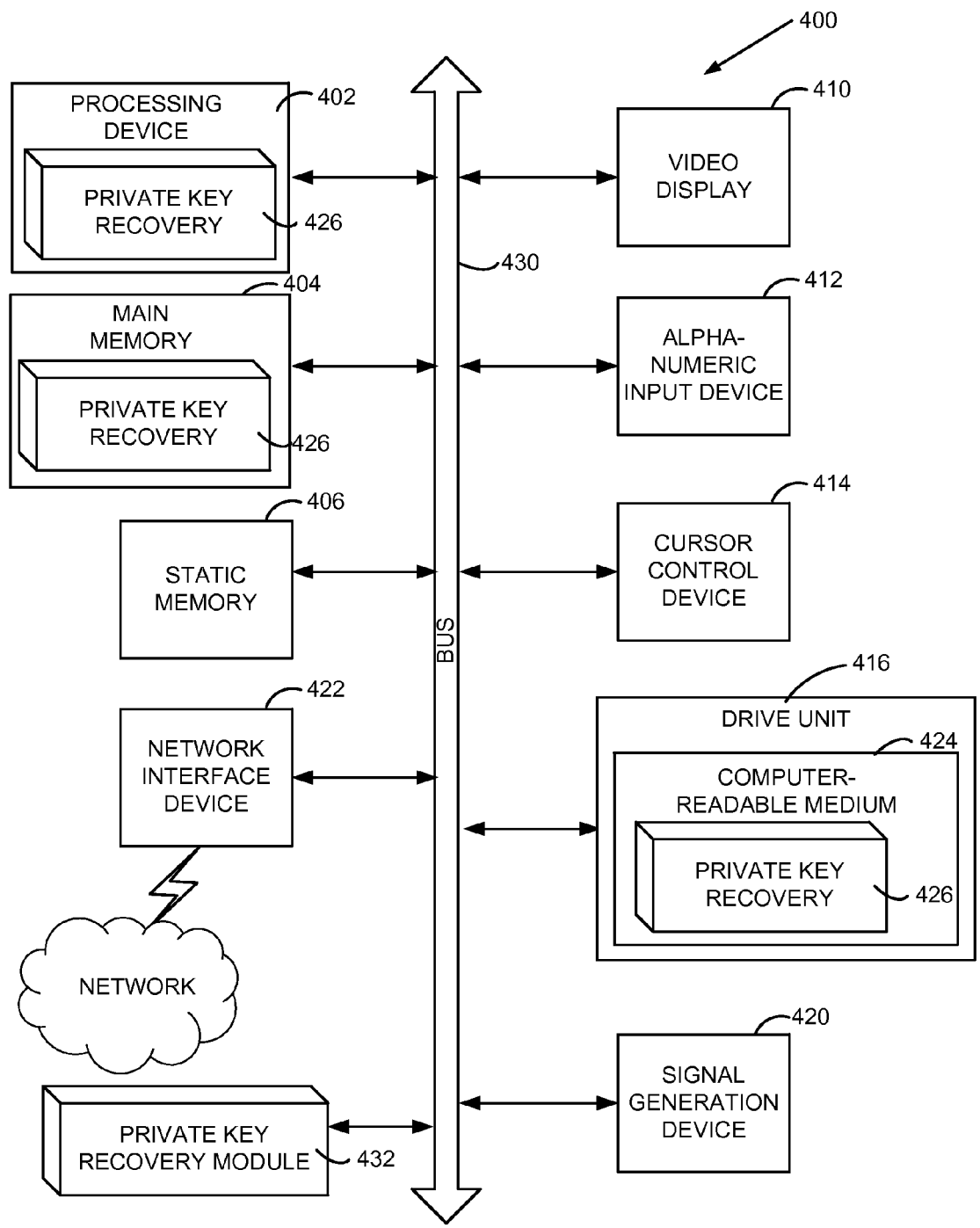
FIG. 4 illustrates a diagrammatic representation of a machine in the exemplary form of a computer system for private key recovery for clients.

FIG. 4 illustrates a diagrammatic representation of a machine in the exemplary form of a computer system 400 for private key recovery for clients. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of private key recovery for clients, such as the method 300 described above. In one embodiment, the computer system 400 represents various components that may be implemented in the certificate system 120 as described above. Alternatively, the certificate system 120 may include more or less components as illustrated in the computer system 400.

The exemplary computer system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., private key recovery) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 on which is stored one or more sets of instructions (e.g., private key recovery 426) embodying any one or more of the methodologies or functions described herein. The private key recovery may also reside, completely or at least partially, within the main memory 404 and/or within the processing device 402 during execution thereof by the computer system 400, the main memory 404 and the processing device 402 also constituting non-transitory computer-readable storage media. The private key recovery 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The private key recovery module 432, components, and other features described herein (for example in relation to FIGS. 1 and 2) can be implemented as discrete hardware components or integrated in the functionality of hardware components such as ASICS, FPGAs, DSPs or similar devices. In addition, the private key recovery module 432 can be implemented as firmware or functional circuitry within hardware devices. Further, the private key recovery module 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   receiving, by a processing device to execute a data recovery manager (DRM), a key recovery request from a requester to recover a private key of a digital certificate for a client;
   receiving a password from the requester, wherein the password is encrypted using a public key of a transport key pair of the DRM;
   decrypting the password using a private key of the transport key pair of the DRM;
   obtaining, at the DRM, the private key of the digital certificate from a key repository, wherein the private key of the digital certificate is encrypted using a public key of a storage key pair;
   decrypting the private key retrieved from the key repository using a private key of the storage key pair;
   packaging, at the DRM, the private key and the digital certificate in a file;
   encrypting, at the DRM, the packaged file using the password received from the requester before transmission over a network; and
   delivering, using the DRM, the encrypted packaged file to the requester over the network, wherein delivering comprises sending a message to the requester with a link to a location of the encrypted packaged file to allow the requester to retrieve the encrypted packaged file.

2. The method of claim 1, wherein the encrypted packaged file is a Public Key Cryptography Standard #12 (PKCS12) file.

3. The method of claim 1, further comprising sending an email message to the requester with the encrypted packaged file as an attachment to the email message.

4. The method of claim 1, wherein the client is a non-token client.

5. The method of claim 1, further comprising:
   packaging the digital certificate and the private key as a Public Key Cryptography Standard #12 (PKCS12) package file, wherein said encrypting comprises encrypting the PKCS12 package file with the password provided by the requester, and wherein said delivering comprises delivering the encrypted PKCS12 package file to the requester.

6. The method of claim 1, further comprising:
   presenting to the requester a user interface for the key recovery request on a web page, wherein the user interface comprises an input field to receive the password from the requester;
   receiving the key recovery request and the password from the requester, wherein the password of the key recovery request is encrypted using the public key of the transport key pair of the DRM;
   approving the key recovery request;
   retrieving the private key from a key repository when the key recovery request is approved; and
   decrypting the password by the DRM, wherein said encrypting the private key comprises encrypting at least the private key of the digital certificate in an encrypted packaged file using the decrypted password, wherein said delivering comprises delivering the encrypted packaged file to the requester.

7. The method of claim 6, further comprising presenting a second user interface comprising a link to a location of the encrypted packaged file to allow the requester to retrieve the encrypted packaged file when the key recovery request is approved.

8. The method of claim 6, further comprising sending an email message to the requester with the encrypted packaged file as an attachment when the key recovery request is approved.

9. A certificate system comprising:
   a memory; and
   a processing device, operatively coupled to the memory, the processing device to:
      implement a key repository to store data concerning key pairs of digital certificates issued by a certificate authority (CA); and
      implement a data recovery manager (DRM) to
         receive, from a requester, a key recovery request to recover a private key of a digital certificate for a client,
         receive a password from the requester, wherein the password is encrypted using a public key of a transport key pair of the DRM,
         decrypt the password using a private key of the transport key pair of the DRM,
         obtain the private key of the digital certificate from a key repository, wherein the private key of the digital certificate is encrypted using a public key of a storage key pair, and
         decrypt the private key retrieved from the key repository using a private key of the storage key pair, wherein the DRM is to:
            package the private key and the digital certificate in a file,
            encrypt the packaged file using the password received from the requester before transmission over a network, and
            deliver the encrypted packaged file to the requester over the network, wherein delivering comprises sending a message to the requester with a link to a location of the encrypted packaged file to allow the requester to retrieve the encrypted packaged file.

10. The certificate system of claim 9, wherein the processing device is to execute the DRM to:
   receive the key recovery request and to authorize the key recovery request;
   decrypt the password provided by the requester;
   retrieve the private key from the key repository;

encrypt the private key in the encrypted packaged file using the decrypted password; and deliver the encrypted packaged file to the requester.

11. The certificate system of claim 10, wherein to deliver the encrypted packaged file to the requester, the processing device is to send the message to the requester when the key recovery request is approved.

12. The certificate system of claim 10, wherein to deliver the encrypted packaged file to the requester, the processing device is to send an email message to the requester with the encrypted packaged file as an attachment to the email message when the key recovery request is approved.

13. The certificate system of claim 9, wherein the encrypted packaged file is a Public Key Cryptography Standard #12 (PKCS12) file.

14. The certificate system of claim 9, further comprising a certificate manager coupled to the DRM, wherein the certificate manager is to receive the key recovery request from the requester and to send the key recovery request to the DRM.

15. The certificate system of claim 14, further comprising a token processing system (TPS) coupled to the DRM, wherein the TPS is to receive the key recovery request from the client and to send the key recovery request to the DRM, wherein the client is a token client.

16. A non-transitory machine-readable storage medium having instructions which, when executed, cause a processing device to:

receive, at a data recovery manager (DRM) of the processing device, a key recovery request from a requester to recover a private key of a digital certificate for a client;

receive a password from the requester, wherein the password is encrypted using a public key of a transport key pair of the DRM;

decrypt the password using a private key of the transport key pair of the DRM;

obtain, at the DRM, the private key of the digital certificate from a key repository, wherein the private key of the digital certificate is encrypted using a public key of a storage key pair;

decrypt the private key retrieved from the key repository using a private key of the storage key pair;

package, at the DRM, the private key and the digital certificate in a file;

encrypt, at the DRM, the packaged file using the password received from the requester before transmission over a network; and deliver, using the DRM, the encrypted packaged file to the requester over the network, wherein delivering comprises sending a message to the requester with a link to a location of the encrypted packaged file to allow the requester to retrieve the encrypted packaged file.

17. The non-transitory machine-readable storage medium of claim 16, wherein the encrypted packaged file is a Public Key Cryptography Standard #12 (PKCS12) file.

18. The non-transitory machine-readable storage medium of claim 16, wherein the client is a non-token client.

* * * * *